March 8, 1932.  I. BOER, HZN  1,848,558
AERIAL PHOTOGRAPHIC MAPPING
Filed Oct. 28, 1927   3 Sheets-Sheet 2
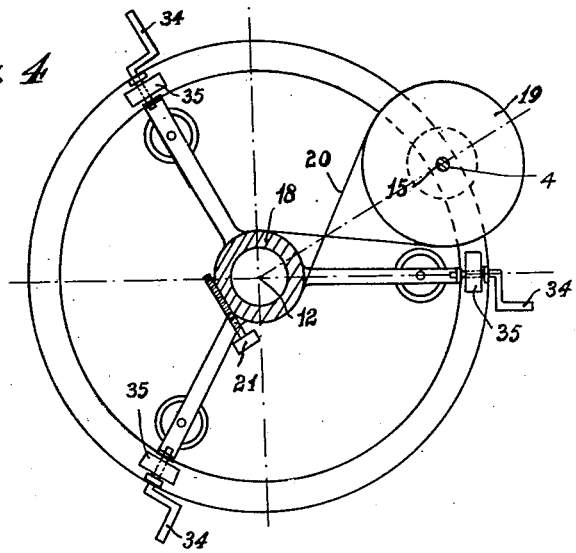
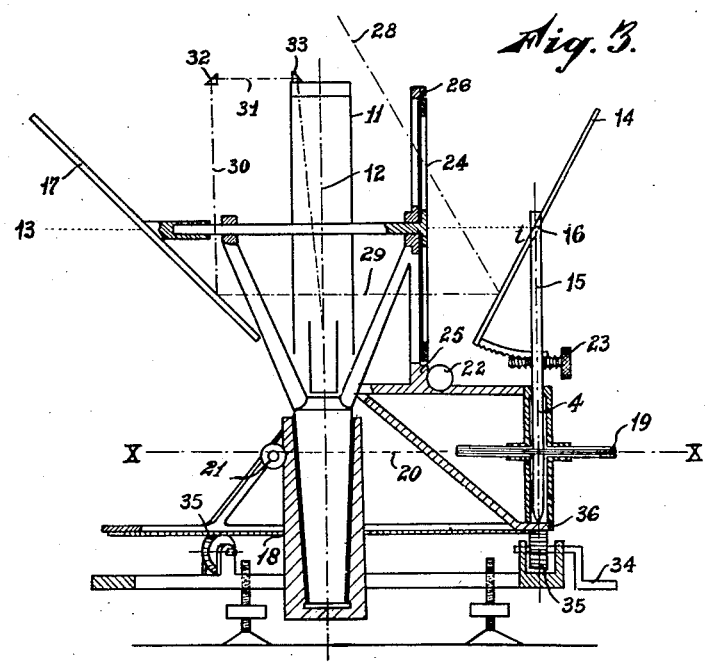
INVENTOR
Izak Boer, Hzn.
by
Attorney

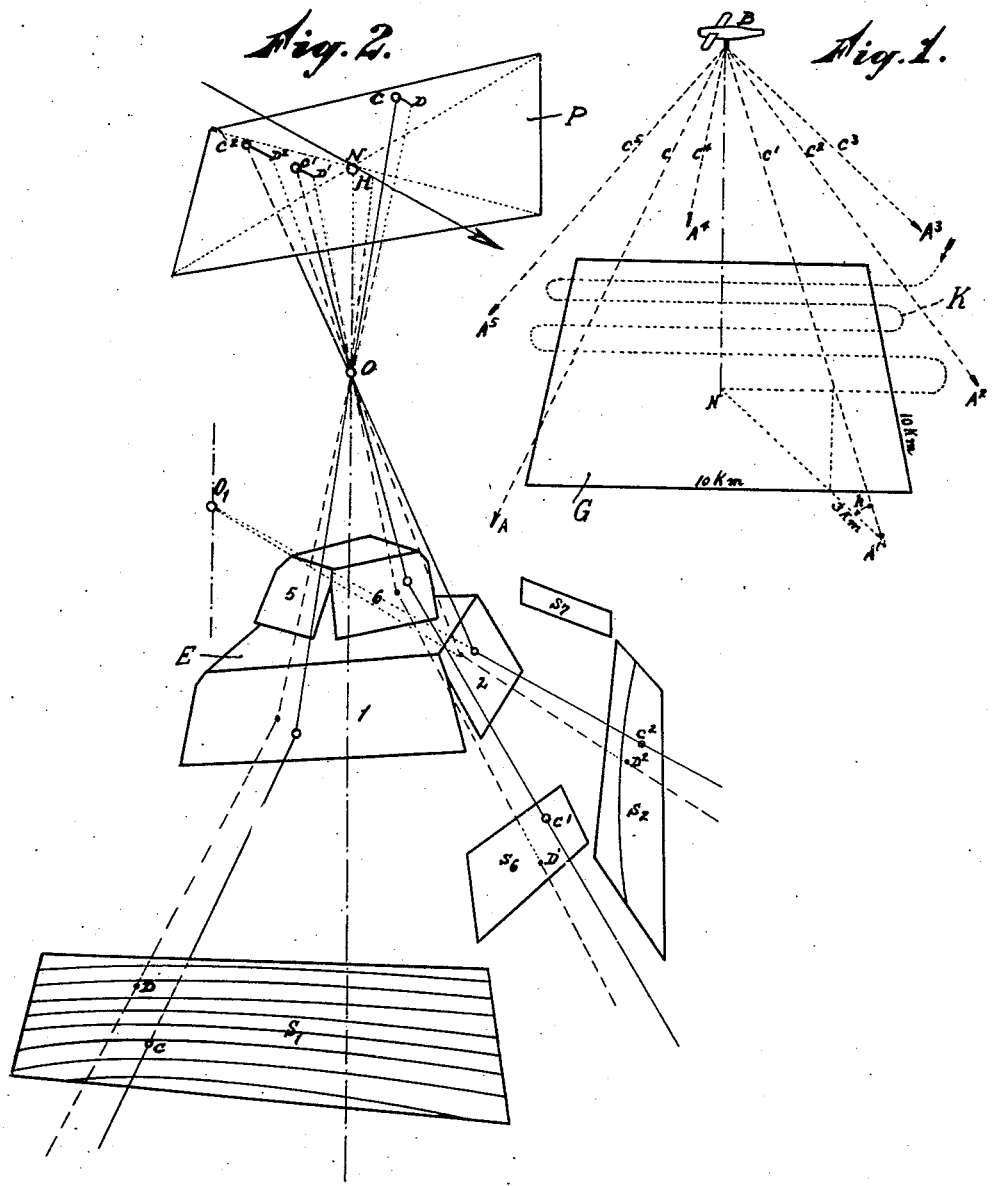

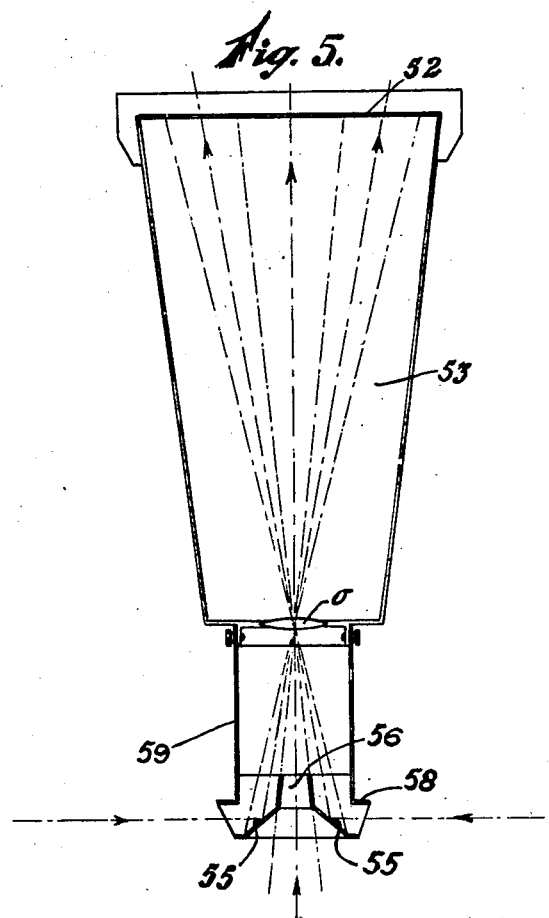

Patented Mar. 8, 1932

1,848,558

UNITED STATES PATENT OFFICE

IZAK BOER, HZN., OF ARNHEM, NETHERLANDS

AERIAL PHOTOGRAPHIC MAPPING

Application filed October 28, 1927, Serial No. 229,401, and in Germany November 6, 1926.

My invention relates to a process of and apparatus for plotting photographs of the country for mapping purposes from air photographs. This process has for its object an increase in the exactness and a reduction of the time required for determining its basic elements; the amount and direction of tilt, place, and direction of survey (external orientation). It is based upon the idea of using as a starting means rays of light of which only the spacial direction must be known, whereas the geodetical position of the points from which those rays of light are emitted is indeterminate, and need not, as in the known methods, be determined for every image fresh fixed or starting points. With my novel process for photogrammetrical survey from the air, luminous points are also photographed and the amount and direction of tilt of the camera subsequently determined by reversing the direction of the rays of light by means of a projecting apparatus.

However the novel feature according to my invention essentially consists in directing at the moment of exposure, rays of light emerging from geodetically unknown points in the country at the photographing aircraft by means of a special apparatus, such as a heliostat, reflector or the like and measuring the vertical angles or zenith distances of the said rays of light directed at the aircraft. With the projective reversal of the direction of the rays of light the sections of the conic shells defined by said vertical angles are used to assist in determining the direction and amount of tilt.

My invention further relates to a suitable equipment especially adapted for carrying out my process.

In the accompanying drawings the subject of my invention is schematically elucidated by way of example.

In the drawings.

Figure 1 represents the circumstances prevailing during the survey.

Figure 2 represents a diagrammatic perspective view of the reversing apparatus.

Figure 3 represents diagrammatically a vertical section of a heliostat through the axis of the telescope adjusted into the vertical.

Figure 4 shows a top view of a horizontal projection from a horizontal plane of intersection along the line X—X of Figure 3.

Figure 5 represents diagrammatically a vertical section of a suitable camera for the purpose of my invention.

According to my invention a number of, for instance six, heliostats or reflectors, A, $A^1$, $A^2$, $A^3$, $A^4$, $A^5$ are placed around the area G to be surveyed (Fig. 1). Points are chosen which allow a free view of the aircraft B during its flight above the country to be surveyed and measurement of the vertical angles C, $C^1$, $C^2$, $C^3$, $C^4$, $C^5$ of the rays of light relatively to the horizontal plane. Those points may be situated on the earth, on towers or on the water.

In order to take photogrammetrical images of the area G of for instance 100 square kilometers, to be surveyed, the aircraft B flies above the area in the known way along parallel lines K and turns around outside of the area to be surveyed, at the same time taking mutually overlapping vertical photographs as already known in the art.

During this flight the heliostats or reflectors A, $A^1$, $A^2$, $A^3$, $A^4$, $A^5$ are continuously operated. By means of each of these apparatus a ray of light is continuously directed at the surveying aircraft and the respective vertical angle $h$ is measured, for instance at the moment of each separate exposure, which is transmitted by wireless from the aircraft B and registered. Said measurement and registration may also be carried out by photographing at short intervals the position of the index or nonius of each heliostat and that of the second hands of a watch.

For taking the photographs, preferably, a camera with a mirror device 59 (Fig. 5) known to the art is used, the extensions 58 and mirrors or prisms 55 serving for photographing the country situated in the vicinity of the points A, $A^1$, $A^2$, $A^3$, $A^4$, $A^5$ etc., at which the heliostats are placed, said country being situated outside the area to be surveyed.

According to this example, the separate images of the country surrounding the area to be surveyed are photographed upon the outer margin of the sensitive plate in the centre whereof the vertical photograph of the country to be surveyed is taken by means of the tubular central aperture 56 of the extension 59. A single objective $o$ may be used for taking the vertical photographs of the country proper as well as for taking the orientation photographs by means of the mirrors.

However in actual practice usually two cameras with parallel sensitive plates are employed, one thereof being intended for taking the photographs of the area to be surveyed and the other one (i. e. the orientation camera provided with the mirror apparatus) for taking the photographs of the luminous points $A, A^1, A^2, A^3, A^4, A^5$ etc.

The circumstance that the orientation photographs will be inexact or undefined owing to the great distances is of no consequence, provided that the image of the rays of light directed at the camera by the respective heliostats can be clearly recognized.

The orientation (determination of the amount and direction of tilt) of the vertically taken photographs for the purpose of the subsequent plotting or stereoscopic measurement is carried out by means of a reversing apparatus (Fig. 2), the mirrors 1, 2, 5 and 6 thereof being adjusted like the mirrors 55 of the photographic camera (Fig. 5). For simplicity only four mirrors are shown in the drawings.

With said reversing apparatus, rays of light emerging from the images $C, D, C', D'$ etc. of the light of the heliostats upon the photograph are reversed in directions corresponding to the directions of the incident light with the exposure. As is known an exactly vertical direction of the axis of the camera can generally not be maintained with the vertically taken photographs. To exactly adjust the produced amount and direction of tilt the reversing apparatus is moved around the centre of the objective until the reversed rays of light make the same vertical angles with the horizontal plane as the rays of light emerging from the heliostats with the exposure. Such adjustment could also be accomplished by fixedly arranging the carrier of the plate P connected with the mirror apparatus E (Fig. 2) and arranging the screens $S_1, S_2, S_6, S_7$ upon which the positions of the heliostats are projected upon one common movable carrier or upon a plurality of movable carriers.

The mirror apparatus E may comprise two rows each comprising four like mirrors forming the sides of two equilateral pyramids with the axes thereof coinciding with the axis of the camera if such mirror apparatus has been used beneath the photographic camera with the exposure.

Of said mirrors and screens in Figure 2 the mirrors 1, 2, 5 and 6 and the screens $S_1, S_2, S_6$ and $S_7$ are shown.

$C, C^1, C^2$ etc. indicate the images of the rays of light, formed upon the plate of the camera P by the rays of light indicated in Figure 1 by the same reference characters, the axis of the camera being vertical. $D, D^1, D^2$ etc. indicate the images of the rays of light when the axis of the camera is not vertical. The reversed rays of light through the points $D, D_1, D_2$ etc. representing the images of the rays of light upon the plate of the orientation camera are contracted by two double collecting lenses one above and one below the objective O so that they produce images of the rays of light indicated by the same reference characters upon the screens which are mounted in the focal plane of the reflected image $o'$ of the optical system (collecting lenses and objective). Now, if the vertical angles of said rays of light through $D, D^1, D^2$, etc upon the screen are in agreement with the measured angles at the heliostats, these images coincide with the points where the rays of light emitted by the heliostat would have pierced the surfaces of the screens. Before dealing more particularly with this point it will be necessary to explain the curves drawn on the screens representing conic sections.

All extensions of the rays of light, after reflection by one of the reflecting surfaces 1, 2, 5, 6 etc., pass through the centre of the objective, and cross each other at the corresponding imaginary reflected image of the centre of the objective. In the interest of clearness only one of those imaginary reflected images of the objective has been indicated in the drawings, namely with relation to the mirror 2, as represented by the point $O'$. The point $O'$ lies in the vertical plane through the axis of the camera, said plane being perpendicular to the mirror. The point on the mirror at which the rays of light are reflected is at equal distance from O and $O'$. The perpendicular drawn from $O'$ upon the screen crosses the latter at the cardinal point of the reflected focal plane of the collecting lens and has a length which is equal to the focal length of this lens.

Now imagining a conic shell with $O'$ as vertex and with a vertical line through $O'$ as axis, rays of light emerging from $O'$ and lying in the conic shell, will all make the same vertical angle with the plane of the screen $S_2$. On the other hand, all rays of light making the same vertical angles with the horizontal plane represented by the screen $S_2$ and directed at $O'$ lie in the same conic shell and cross the screen surface in the section line of the screen surface and the conic shell.

If there are drawn on the screen conic sections of the above-mentioned kind corresponding to angles of entire degrees or parts of degrees, which angles are formed by a number of such conic shells with the horizontal plane, a ray of light going through O' with a known vertical angle with the horizontal plane may be adjusted in relation to the drawn conic sections in agreement with said known angle.

This manipulation being performed by displacement of the plate with the image in the direction of both axes of the plate, rays of light being emitted by at least three images of luminous points upon the photograph, the cardinal point H as well as the plane of the plate P will be in the same position as during the exposure so that the direction and amount of tilt can be calculated. However this is not necessary as subsequent to said adjustment the plotting may be directly performed for instance through the central aperture of the mirror apparatus E, said aperture corresponding to the aperture 56 of the mirror apparatus beneath the camera (Fig. 5).

An embodiment of the heliostat used in the process according to my invention is represented by way of example in Figs. 3 and 4. The telescope 11 may be rotated around a vertical axis 12 and a horizontal axis 13, in the way as usual with theodolites.

The mirror 14 is rotatable around a vertical axis 15 and a horizontal axis, the latter being perpendicular to the plane of the drawing at 16. The mirror 17 makes an angle of 45° with the axis of the telescope and rotates together with the telescope 11 around the horizontal axis 13 to which it has also an inclination of 45°. The rotation of the telescope 11 and of the mirror 17 around the horizontal axis 13 is obtained by the screw 22; the rotation of the mirror 14 around the horizontal axis in 16 is obtained by the screw 23. The angle between the axis of the telescope and the horizontal plane may be read at 25 or 26 upon a circle 24 indicating the altitude.

Besides these known details the heliostat according to the invention comprises a device 19, 20 and 21 for transmitting the rotation around the vertical axis 12 in the ratio of two to one to the vertical axis of rotation 15 of the mirror 14.

With the embodiment shown in the drawings this is obtained by means of a belt 20 embracing a fixed socket tube 18 and a pulley 19 mounted on the axis 15. This belt is connected by means of a set-screw 21 to the socket 18. Other devices such as planet-wheels may be used for this purpose. The radius of the pulley 19 is twice as large as that of the socket tube 18. The horizontal component of the sun's movement may therefore be followed by turning the set-screw 21. However, by means of this screw, at the same time small errors in the construction of the device may be corrected. The re-adjustment to follow the horizontal component of the motion of the aircraft is performed by means of the three handles 34 with toothed wheels 35, engaging with a corresponding rack upon the ring 36. Furthermore, the apparatus comprises as a new element according to the invention the prism system 32, 33 by which a small pencil of rays 28, 29, 30 and 31 is reflected by the mirror 17 into the objective of the telescope so that at the cross-hairs of the telescope a faint image of the sun-disc may be seen and the observer may keep the image of the aircraft continuously within the image of the sun-disc.

In this case with correct adjustment of the apparatus it is certain that the sunbeams reflected by the heliostat will always be pointed at the aircraft.

In the claims:

1. A method of photogrammetrical survey from the air comprising photographing besides the desired area also a plurality of luminous distant geodetically undetermined points, measuring at the moment of exposure the vertical angles of the rays of light directed at the aircraft from said luminous points, reversing the direction of the rays of light by means of a projecting apparatus, equalizing the vertical angles of the reversed rays of light with conic sections, corresponding to angles of a known predetermined mutually equal value formed by a plurality of conic shells with the horizontal plane, adjusting the exposed light sensitive surface showing the images of the said luminous points into a position in which the first mentioned measured vertical angles and the vertical angles of said reversed rays of light are equal and determining the amount and direction of tilt at the moment of exposure.

2. A reversing apparatus for use in making photogrammetrical survey from aircraft, comprising a light sensitive medium which has been exposed in the aircraft camera showing images of light reflecting and directing means thereon, an objective similar to that of the aircraft camera, the same mirror apparatus as used for directing the light of the said light reflecting and directing means at the light sensitive medium in the aircraft camera said mirror apparatus comprising a plurality of mirrors positioned in one row, the mirrors of said row being arranged at the same distance and at the same angle in relation to the optical axis of the camera and a plurality of screens each screen being positioned opposite a mirror of the said mirror apparatus, said screens having conic sectional lines corresponding to known vertical angles in relation to which the reversed rays of light are equalized with the measured values of the vertical angles at the said light reflecting and directing means and means for displacing the said exposed light sensitive medium.

3. A heliostat for use in making photogrammetrical survey from aircraft comprising a mirror rotatably mounted about a horizontal axis, a support for said mirror rotatably mounted about a vertical axis, a telescope rotatable about a vertical and horizontal axis and rotation transmitting means between said support for the first mentioned mirror and said telescope.

4. A heliostat for use in making photogrammetrical survey from aircraft comprising a mirror rotatably mounted about a horizontal axis, a support for said mirror rotatably mounted about a vertical axis, a telescope rotatably mounted in a fixed socket tube and rotatable about a vertical and horizontal axis and rotation transmitting means between said support for the first mentioned mirror and said telescope, comprising a pulley mounted on said support, a socket tube of half the diameter of said pulley and a belt frictionally engaging said pulley and said socket tube.

5. A heliostat for use in making photogrammetrical survey from aircraft comprising a mirror rotatably mounted about a horizontal axis, a support for said mirror rotatably mounted about a vertical axis, a telescope adapted to be rotated about a vertical and a horizontal axis, an inclined mirror rotatable integrally with said telescope about the horizontal axis thereof and making an angle of 45° therewith and a system of prisms transmitting an image of the sun into said telescope to be superimposed upon the image of said aircraft, thereby directing the rays of the sun at said aircraft.

In testimony whereof I affix my signature.

IZAK BOER, Hzn.